(12) United States Patent
Portnoy et al.

(10) Patent No.: US 11,568,565 B2
(45) Date of Patent: Jan. 31, 2023

(54) RENDERING-BASED LIDAR AND CAMERA ALIGNMENT

(71) Applicant: GM GLOBAL TECHNOLOGY OPERATIONS LLC, Detroit, MI (US)

(72) Inventors: Doron Portnoy, Kfra Yona (IL); Amit Batikoff, Patch Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 17/358,162

(22) Filed: Jun. 25, 2021

(65) Prior Publication Data
US 2022/0414923 A1  Dec. 29, 2022

(51) Int. Cl.
  *G06T 7/73*   (2017.01)
  *H04N 5/272*  (2006.01)
  *G01S 19/39*  (2010.01)
  *G01S 17/89*  (2020.01)

(52) U.S. Cl.
  CPC ............... *G06T 7/74* (2017.01); *G01S 17/89* (2013.01); *G01S 19/39* (2013.01); *H04N 5/272* (2013.01); *G06T 2207/10028* (2013.01); *G06T 2207/20084* (2013.01)

(58) Field of Classification Search
  CPC ............. G06T 7/74; G06T 2207/10028; G06T 2207/20084; G01S 17/89; G01S 19/39; H04N 5/272

USPC ......................................................... 348/148
See application file for complete search history.

(56) References Cited

U.S. PATENT DOCUMENTS

| 10,872,228 | B1* | 12/2020 | Zhou ...................... G06V 20/64 |
| 2018/0136332 | A1* | 5/2018 | Barfield, Jr. ........... G06V 20/58 |
| 2018/0203124 | A1* | 7/2018 | Izzat ....................... G01S 17/89 |
| 2019/0122386 | A1* | 4/2019 | Wheeler ................ G01S 17/42 |
| 2021/0004610 | A1* | 1/2021 | Huang .................. G01S 17/931 |
| 2022/0128700 | A1* | 4/2022 | Saranin .................... G06T 7/162 |
| 2022/0128701 | A1* | 4/2022 | Alghanem .............. G01S 17/89 |
| 2022/0128702 | A1* | 4/2022 | Ziglar ..................... G06T 7/187 |

\* cited by examiner

*Primary Examiner* — John W Miller
*Assistant Examiner* — Sean N. Haiem
(74) *Attorney, Agent, or Firm* — Vivacqua Crane PLLC

(57) ABSTRACT

A method for alignment a lidar with a camera of a vehicle includes: aggregating multiple lidar scans performed by the lidar of a vehicle while the vehicle is in motion to generate an aggregated point-cloud; rendering the aggregate point-cloud onto a camera image to generate a rendered image; comparing the rendered image with the camera image to determine a difference between the rendered image and the camera image, wherein a difference value is indicative of the difference between the rendered image and the camera image is represented; and determining that the camera is aligned with the lidar in response to determining that the difference value is less than or equal to a predetermined threshold.

16 Claims, 3 Drawing Sheets

RENDERING-BASED LIDAR AND CAMERA ALIGNMENT

INTRODUCTION

The present disclosure relates to vehicles, and more particularly, to a rendering-based lidar and camera alignment.

SUMMARY

The present method and system allow for accurate alignment between a lidar and a camera of vehicles in target-less environments. In this target-less data driven alignment between aggregated lidar point-cloud and camera image, the lidar point-cloud is aggregated using high accuracy navigation system. Relative pose between the lidar and the camera is computed through an end-to-end differentiable optimization process by rendering the aggregate point-cloud on the image plane and comparing it to camera image. This method and system provide the following advantages, namely: high accuracy alignment is achieved by temporal lidar aggregation; object filtering allows calibration in dynamic scenes; directly comparing two color images avoids multi-modality problems; rendering and comparing flow avoids the need of feature extraction; and end-to-end optimization flow for alignment.

In this method, dynamic objects are filtered from both raw lidar and camera data using a deep neural network object detector. The filtered lidar is aggregated taking the motion of the host vehicle into account using a high accuracy navigation system. Then, two optimization steps are performed until convergence, namely: the aggregated point-cloud is rendered to the camera plane using estimated alignment and color; the rendered image is directly compared to camera image; and then the pose and the color are simultaneously updated.

The present disclosure describes a method for aligning a lidar with a camera of a vehicle. In an aspect of the present disclosure, the method includes: aggregating multiple lidar scans performed by the lidar of a vehicle while the vehicle is in motion to generate an aggregated point-cloud; receiving a camera image captured by the camera of the vehicle while the vehicle is in motion; rendering the aggregate point-cloud onto the camera image to generate a rendered image; comparing the rendered image with the camera image to determine a pose difference value between the rendered image and the camera image and a color difference value between the rendered image and the camera image; determining that the camera is aligned with the lidar in response to determining that the pose difference value between the rendered image and the camera image is less than or equal to a predetermined pose threshold and that the color difference value between the rendered image and the camera image is less than or equal to a predetermined color threshold.

In an aspect of the present disclosure, the method further includes removing dynamic objects from the multiple lidar scans using a deep neural network object detector before rendering the aggregate point-cloud onto the camera image to generate the rendered image.

In an aspect of the present disclosure, the method further includes removing dynamic objects from the camera image using a deep neural network object detector before rendering the aggregate point-cloud onto the camera image to generate a rendered image.

In an aspect of the present disclosure, the aggregated point-cloud includes a plurality of lidar points. Each lidar point has a position and a color.

In an aspect of the present disclosure, the position and the color of each of the plurality of lidar points are used to generate the rendered image.

In an aspect of the present disclosure, the method further includes updating the color and a pose of the aggregated point-cloud using the difference value to generate an updated color and an updated pose, respectively, in response to determining that the difference value is greater than the predetermined threshold.

In an aspect of the present disclosure, the method further includes rendering again aggregate point-cloud onto the camera image using the updated color and the updated pose to generate an updated rendered image in response to determining that the difference value is greater than the predetermined threshold.

In an aspect of the present disclosure, the method does not include a feature extraction process.

In an aspect of the present disclosure, the method further includes receiving the multiple lidar scans from the lidar of the vehicle, and the multiple lidar scans are performed at different times while the vehicle is in motion.

In an aspect of the present disclosure, multiple lidar scans are aggregated using a navigation system of the vehicle. Thus, aggregating the multiple lidar scans may be performed using the navigation system of the vehicle.

The present disclosure also describes a control system for aligning a lidar with a camera of a vehicle system. The control system includes a controller in communication with the vehicle system. The controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The present disclosure will be described in conjunction with the following figures, wherein like numerals denote like elements.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
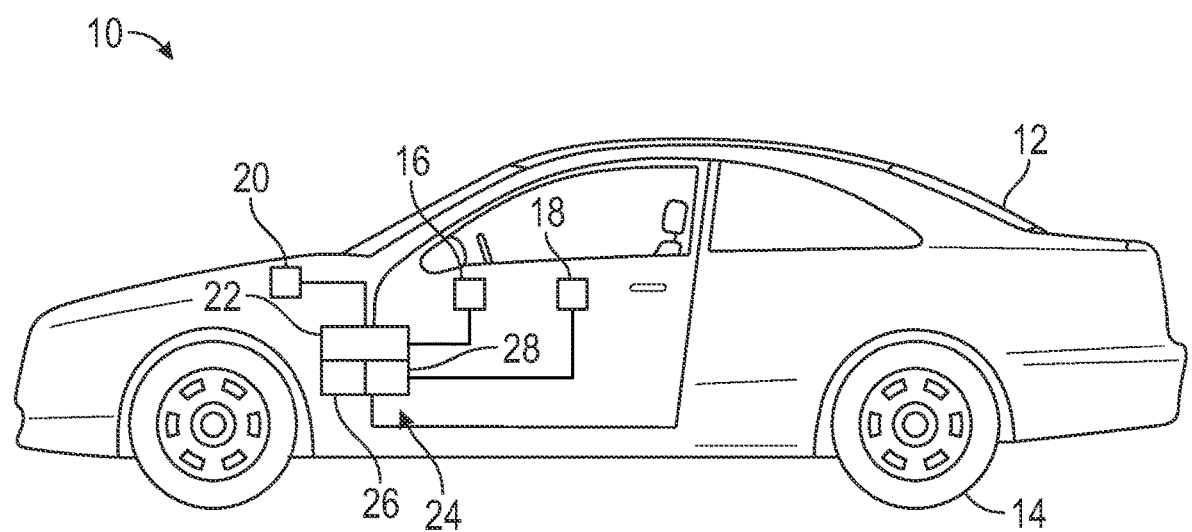
FIG. 1 is a schematic, side view of a vehicle.

With reference to FIG. 1, a vehicle 10 includes a vehicle body 12 and a plurality of wheels 14. In addition to the wheels 14, the vehicle 10 includes one or more lidars 16 (i.e., light detection and ranging system), one or more cameras 18, and a navigation system 20. The lidar 16 is a detection system which works on the principle of radar, but uses light from a laser. The lidar 16 uses light in the form of a pulsed laser to measure ranges (variable distances) to the objects. The cameras 18 are each configured to capture images of objects. The navigation system 20 includes a transceiver or another device that is configured to communication with a Global Navigation Satellite System (GNSS).

The cameras 18, the lidar 16, and the navigation system 20 are in communication with a controller 22. The controller 22 is part of a control system 24 and includes at least one processor 26 and a non-transitory computer readable storage device or media 28. The processor 26 may be a custom-made processor, a central processing unit (CPU), an auxiliary processor among several processors associated with the controller 22, a semiconductor-based microprocessor (in the form of a microchip or chip set), a macroprocessor, a combination thereof, or generally a device for executing instructions. The computer readable storage device or media 28 may include volatile and nonvolatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 22. While shown inside in vehicle 10, the controller 22 may be external to the vehicle 10. Regardless, the controller 22 is in communication with the cameras 18, the lidar 16, and the navigation system 20. The vehicle 10 may be referred to a vehicle system.

Figure 2:
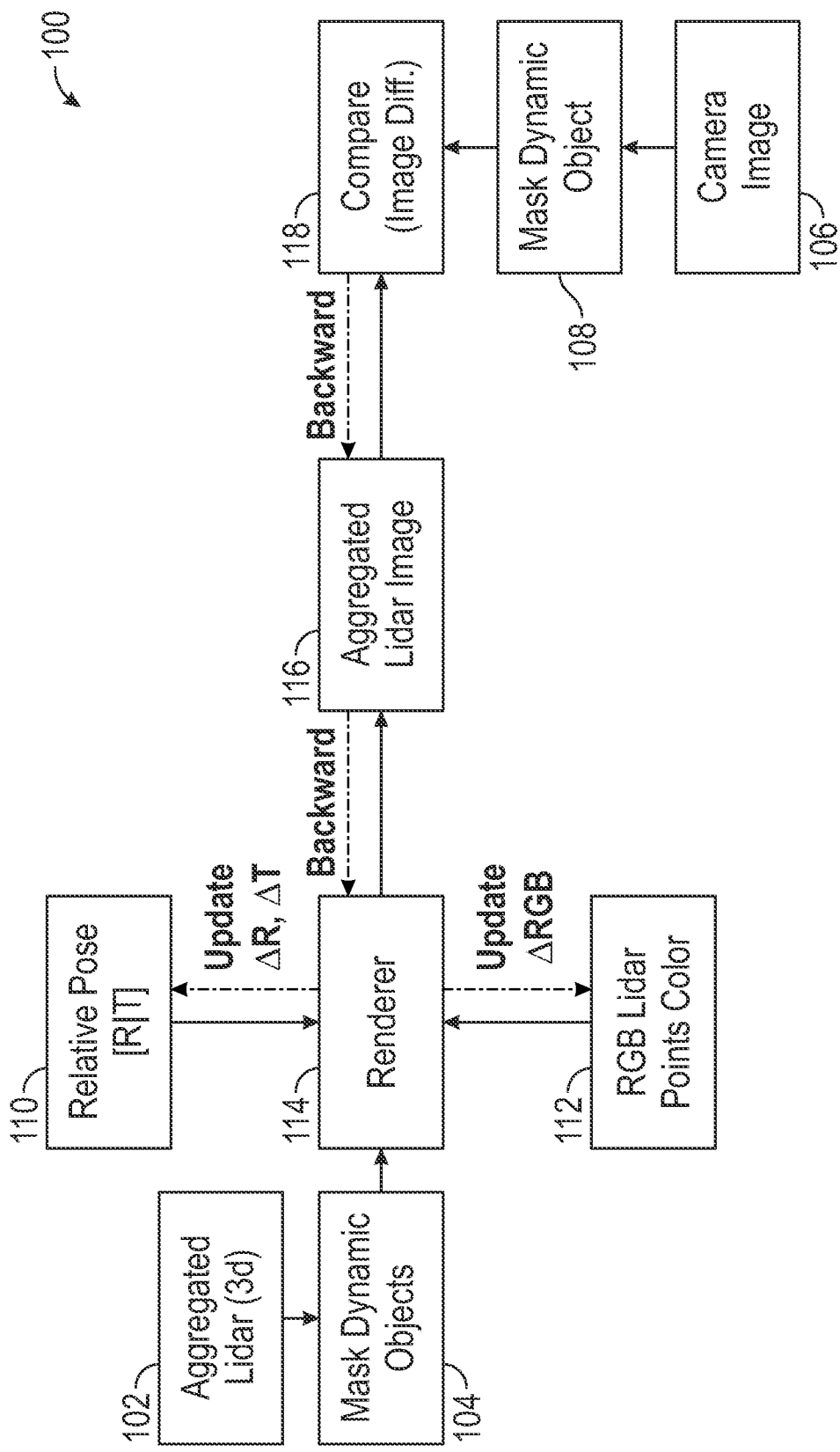
FIG. 2 is a flowchart of a method for render-based lidar and camera alignment.

FIG. 2 is a flowchart of a method 100 for render-based lidar and camera alignment. In other words, the method 100 is used to align the camera 18 with the lidar 16. Each camera 18 is separately processed and optimized with the respective lidar 16. The method 100 begins at block 102, in which the lidar 16 performs multiple lidar scans at different times while the vehicle 10 is in motion. The controller 22 then receives the multiple lidar scans from the lidar 16 of the vehicle 10. Because the lidar 16 have a specific range, the multiple lidar scans from the lidar 16 are aggregated using, for example, the navigation system 20 to virtually extend the range of the lidar 16 to generate a three-dimensional (3D) aggregated point-cloud.

Figure 3:
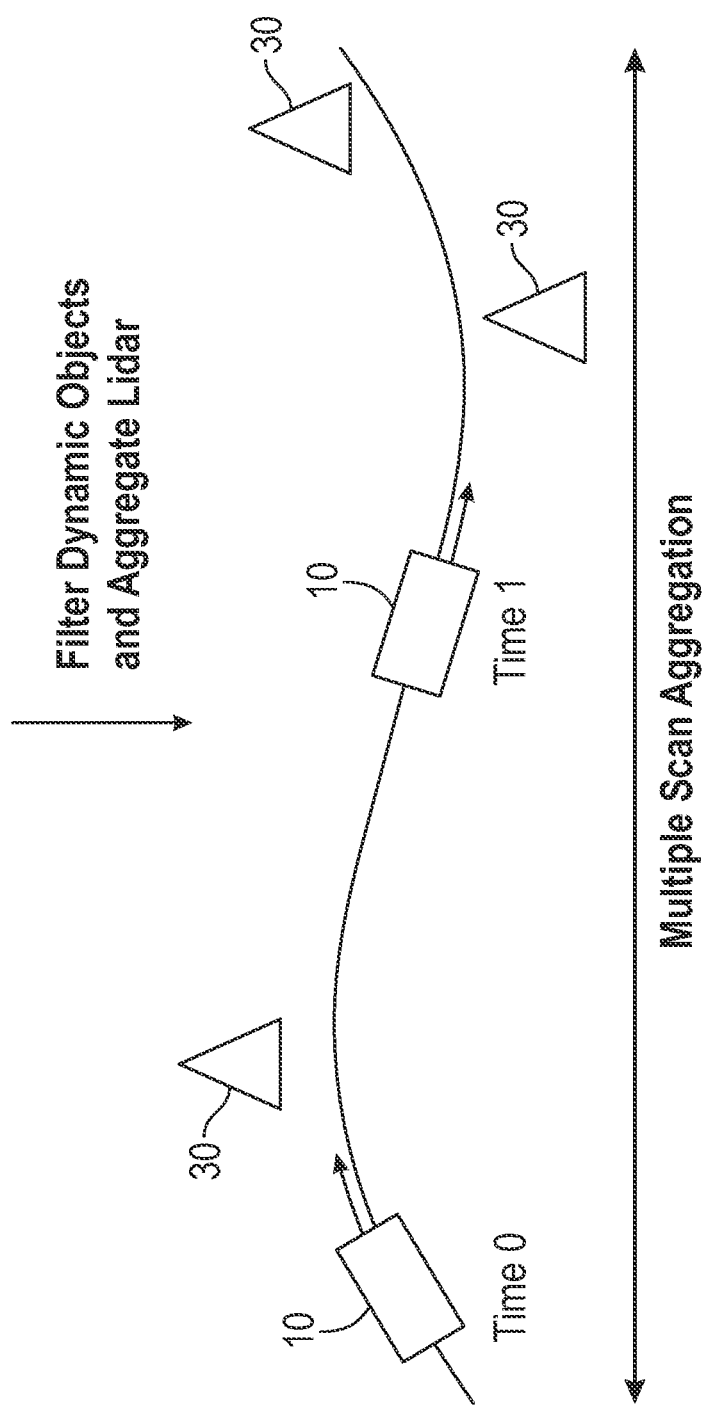
FIG. 3 is a schematic illustration of a multiple scan aggregation process of the method illustrated in FIG. 2.

FIG. 3 shows a schematic illustration of the multiple lidar scans from the lidar 16 being aggregated at different times. The lidar 16 scans and identifies one or more static objects 30 and dynamic objects (not shown), such as moving cars, along the path of the vehicle 10. In the present disclosure, the static objects 30 are stationary relative to the vehicle 10, and the dynamic objects are in motion relative to the static scene. Block 102 may be performed by the controller 22 in combination with the navigation system 20. After aggregating the multiple lidar scans, the method 100 proceeds to block 104. The method 100 then proceeds to block 104.

The aggregated point-cloud includes a plurality of lidar points. Each of the plurality of lidar points has a position [R|T], which is schematically illustrated at block 110, and a color RGB, which is schematically illustrated at block 112. The relative position [R|T] includes a rotation component R and a translation component T. The color RGB may be expressed with the RGB color model and may therefore have a red/R value, a green/G value, and a blue/B value. The lidar scans may be colored using an auxiliary task.

At block 104, the controller 22 removes (i.e., masks) the dynamic objects from the multiple lidar scans using a deep neural network object detector. As a consequence, the dynamic objects are removed from the aggregated point-cloud.

The method 100 also includes block 106. At block 106, the camera 18 captures a two-dimensional camera image at different times while the vehicle 10 is in motion. The original camera image captured by the camera 18 includes dynamic objects and static objects 30 (FIG. 3). The controller 22 then receives the camera images captured by the camera 18. Then, the method 100 proceeds to block 108.

At block 108, the controller 22 removes (i.e., masks) the dynamic objects from the camera images captured by the cameras 18 using a deep neural network object detector. At this point, the camera images do not include the dynamic objects. After block 104 and block 108, the method 100 proceeds to block 114.

At block 114, the controller 22 renders the image aggregated point-cloud onto the camera image captured by the camera 18, thereby generating a rendered image at block 116. The rendered image therefore includes the lidar points superimposed over the camera image captured by the camera 18. To create the rendered image, the controller 22 uses the relative position [R|T] in block 110 and the color RGB in block 112. After creating the rendered image, the method 100 proceeds to block 118.

At block 118, the controller 22 compares the rendered image with the camera image to determine a difference between the rendered image and the camera image. A difference value may be indicative of the difference between the rendered image and the camera image The difference value may include, namely: 1) a pose difference value $\Delta R$, $\Delta T$ between the rendered image and the camera image and 2) a color difference value between the rendered image and the camera image. Rendering at block 114 and comparing at block 118 avoids the need of feature extraction in the method 100. The method 100 is therefore characterized by the absence of feature extraction. If the difference value is less than or equal to a predetermined threshold, then the controller 22 determines that the camera 18 is aligned with the lidar 16 and the method 100 ends. However, if the difference value is greater than the predetermined threshold, then the method 200 returns to blocks 110 and 112.

At block 110, if the difference value is greater than the predetermined threshold, a position of the aggregated point-cloud is updated to generate an updated position [R|T]. At block 112, if the difference value is greater than the predetermined threshold, then the color red-green-blue (RGB) is updated to generate an updated color RGB. The method 100 then returns to block 116. At block 116, the controller 22 renders aggregate point-cloud again onto the camera image using the updated color and the updated pose to generate an updated rendered image in response to determining that the pose difference value between the rendered image and the camera image is greater than the predetermined pose threshold and that the color difference value between the rendered image and the camera image is greater than the predetermined color threshold.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for aligning a lidar with a camera of a vehicle, comprising:
    aggregating multiple lidar scans performed by the lidar of the vehicle while the vehicle is in motion to generate an aggregated point-cloud;
    receiving a camera image captured by the camera of the vehicle while the vehicle is in motion, wherein the camera image includes a plurality of camera image points;
    rendering the aggregate point-cloud onto the camera image to generate a rendered image, wherein the rendered includes a plurality of point-cloud rendered image points;
    comparing the rendered image with the camera image to determine a difference between the rendered image and the camera image, wherein a difference value is indicative of the difference between the plurality of point-cloud rendered image points of the rendered image and the plurality of camera image points of the camera image; and
    determining that the difference value indicating the difference between the plurality of point-cloud rendered image points of the rendered image and the plurality of camera image points of the camera image is greater than a predetermined color threshold, indicating that the camera is misaligned with the lidar;
    updating a color and a pose of the aggregated point-cloud using the difference value to generate an updated color and an updated pose, respectively, in response to determining that the difference value is greater than the predetermined color threshold; and
    rendering again the aggregate point-cloud onto the camera image using the updated color and the updated pose to generate an updated rendered image in response to determining that the difference value is greater than the predetermined color threshold.

2. The method of claim 1, further comprising removing dynamic objects from the multiple lidar scans using a deep neural network object detector before rendering the aggregate point-cloud onto the camera image to generate the rendered image.

3. The method of claim 1, further comprising removing dynamic objects from the camera image using a deep neural network object detector before rendering the aggregate point-cloud onto the camera image to generate a rendered image.

4. The method of claim 1, wherein the aggregated point-cloud includes a plurality of lidar points, and each of the plurality of lidar points has a position and a color.

5. The method of claim 4, wherein the position and the color of each of the plurality of lidar points are used to generate the rendered image.

6. The method of claim 1, wherein the method does not include a feature extraction process.

7. The method of claim 1, further comprising receiving the multiple lidar scans from the lidar of the vehicle, and the multiple lidar scans are performed at different times while the vehicle is in motion.

8. The method of claim 1, wherein aggregating the multiple lidar scans is performed using a navigation system of the vehicle.

9. A control system for aligning a lidar with a camera of a vehicle system, comprising:
    a controller in communication with the vehicle system, wherein the controller is programmed to:
    receive multiple lidar scans from the lidar of the vehicle system;
    aggregate the multiple lidar scans performed by the lidar of a vehicle while the vehicle is in motion to generate an aggregated point-cloud;
    receive a camera image captured by the camera of the vehicle while the vehicle is in motion, wherein the camera image includes a plurality of camera image points;
    render the aggregate point-cloud onto the camera image to generate a rendered image, wherein the rendered image includes a plurality of point-cloud rendered image points;
    compare the rendered image with the camera image to determine a difference between the rendered image and the camera image, wherein a difference value is indicative of the difference between the plurality of point-cloud rendered image points of the rendered image and the plurality of camera image points of the camera image; and
    determine that the difference value indicating the difference between the plurality of point-cloud rendered image points of the rendered image and the plurality of camera image points of the camera image is greater than a predetermined color threshold, indicating that the camera is misaligned with the lidar;
    update a color and a pose of the aggregated point-cloud using the difference value to generate an updated color and an updated pose, respectively, in response to determining that the difference value is greater than the predetermined color threshold; and
    render again the aggregate point-cloud onto the camera image using the updated color and the updated pose to generate an updated rendered image in response to determining that the difference value is greater than the predetermined color threshold.

10. The control system of claim 9, wherein the controller is further programmed to remove dynamic objects from the multiple lidar scans using a deep neural network object detector before rendering the aggregate point-cloud onto the camera image to generate the rendered image.

11. The control system of claim 9, wherein the controller is further programmed to remove dynamic objects from the camera image using a deep neural network object detector before rendering the aggregate point-cloud onto the camera image to generate a rendered image.

12. The control system of claim 9, wherein the aggregated point-cloud includes a plurality of lidar points, each of the plurality of lidar points has a position and a color.

13. The control system of claim 12, wherein the position and the color of each of the plurality of lidar points are used to generate the rendered image.

14. The control system of claim 9, wherein the controller is not programmed with a feature extraction process.

15. The control system of claim 9, wherein the multiple lidar scans are performed at different times while the vehicle is in motion.

16. The control system of claim 9, wherein the multiple lidar scans are aggregated using a navigation system of the vehicle system.

* * * * *